UNITED STATES PATENT OFFICE.

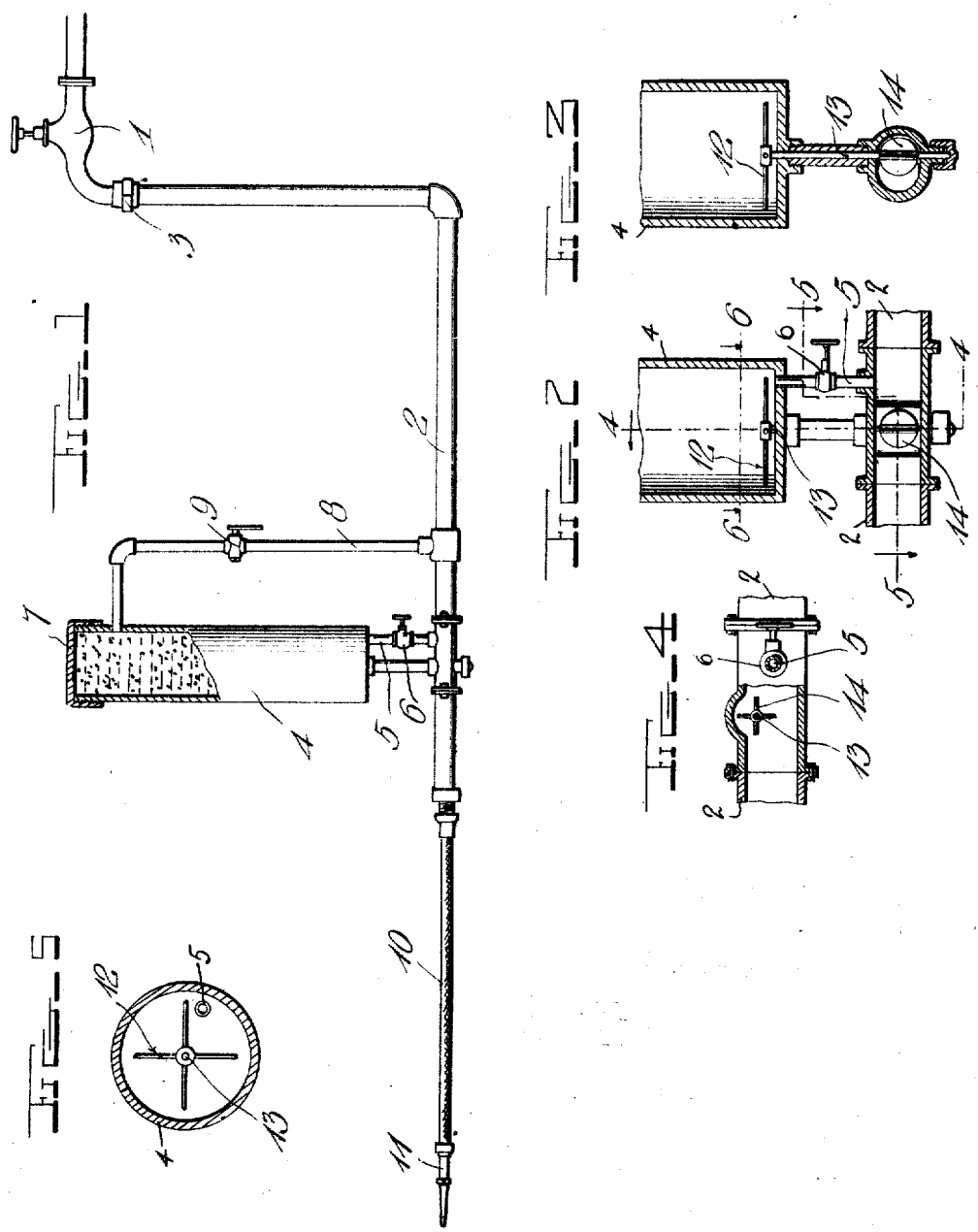

CHARLES F. SITES, OF NEWARK, OHIO.

CHEMICAL SPRAYER AND DISINFECTOR.

1,004,700.  Specification of Letters Patent.  Patented Oct. 3, 1911.

Application filed October 13, 1910. Serial No. 586,946.

*To all whom it may concern:*

Be it known that I, CHARLES F. SITES, a citizen of the United States, residing at Newark, in the county of Licking and State of Ohio, have invented certain new and useful Improvements in Chemical Sprayers and Disinfectors; and I do declare the following to be a full, clear, and exact description of the invention, such as will enable others skilled in the art to which it appertains to make and use the same.

My invention relates to apparatus for spraying or disinfecting with chemicals and has particular reference to means for spraying trees or vegetables for the purpose of destroying the destructive insects and bacteria which feed upon the same.

The object of the invention is to provide an apparatus of this character which will be efficient in operation, which may be applied to any street hydrant or other source of water supply, which will automatically mingle with the stream of water flowing from the hydrant a quantity of poison sufficient to destroy all the insects and bacteria upon the plants and which has a novel means for preventing the chemical collecting in the tank or reservoir in a solid mass that will not be dissolved by a stream of water, thereby insuring the apparatus being in an operative condition at all times.

With these and other objects in view the invention consists of certain novel features of construction, combination and arrangement of parts as will be more fully described and particularly pointed out and claimed.

In the accompanying drawings: Figure 1 is an elevation of an apparatus embodying my invention, part of the reservoir being broken away and in section; Fig. 2 is an enlarged detail sectional view through the lower portion of the reservoir and adjacent parts shown in Fig. 1; Fig. 3 is a vertical section taken on line 4—4 in Fig. 2; Fig. 4 is a horizontal section taken on line 5—5 of Fig. 2; and, Fig. 5 is a horizontal section taken on line 6—6 in Fig. 2.

In the drawings, I have illustrated the device coupled to an ordinary faucet 1 and comprising a pipe 2 having a coupling 3 adapted to removably engage the faucet as will be readily understood. A tank 4 is provided and this tank communicates with the pipe 2 through a short stem or discharge pipe 5 connected with the bottom of the tank at one side of the center having a globe valve 6 mounted therein whereby the flow from the tank to the main pipe 2 may be established or cut off at the will of the operator. The tank 4 is provided with a closure 7 which is adapted to fit air tight over the upper end of the tank and thereby prevent loss of the chemicals through evaporation when the apparatus is not in use and assure its successful operation when in use. A branch pipe 8 leads from the main pipe 2 to the upper end of the tank 4 and is provided with a cut-off valve 9 of any convenient or preferred construction by which the flow of water from the main pipe to the tank may be regulated. Beyond the globe valve 6, the main pipe 2 is connected to a hose section 10 fitted with a nozzle 11 through which the mixed water and chemicals are discharged on to the plants to be treated.

The device being coupled as shown and described, the cut-off 9 and the globe valve 6 are opened and water is then turned into the main pipe from the hydrant or faucet 1 as will be understood. The water will divide at the branch pipe 8 and part of the same will flow through the said pipe and enter the tank 4 where it will commingle with the chemicals therein and then pass through the discharge pipe 5 into the main pipe and thence through the hose 10 and the nozzle 11. When the work has been completed, the valve 6 and cut-off 9 are closed and, if necessary to replenish the supply of chemicals, the cap 7 is removed and the necessary quantity of the chemical or mixture of chemicals placed in the tank, as will be understood.

In order to thoroughly mingle the chemicals with the water while passing through said tank, especially when pasty or solid chemicals are used, I provide means to prevent the chemicals from packing in the bottom of the tank, and, consequently, obstructing the flow through the valve and interfering with the successful operation of the apparatus. To this end I have provided an agitator 12 which is secured to the upper end of a shaft 13 mounted in suitable liquid tight bearings in the bottom of the tank and in the upper side of the pipe 2 at one side of the discharge stem 5 and having a water wheel 14 on its lower end disposed eccentrically in pipe 2 and projecting into the path of the flow through said pipe as will be readily understood. The water being turned into the pipe 2 will flow through the same in the manner previously described and acting upon the wheel 14, will readily rotate the shaft 13 so that the agitator 12 will be caused to stir the contents of the tank and prevent the same collecting at the bottom thereof.

The apparatus arranged as described above will be found very efficient when liquid poison or fluid chemicals are used and requires no special care on the part of the operator. The device may, of course, be constructed in any desired size but will have sufficient capacity when the tank is not conspicuously large so that the discharge nozzle and the source of supply will both ordinarily be above the horizontal plane of the top of the tank, and, consequently, the flow of the water will have sufficient force to rise to and pass into the tank and mix with the chemicals therein.

My improved spraying apparatus will automatically mix the poison and the water so that the operator does not have any work to do but guide the nozzle so that the liquid issuing therefrom will be directed upon the plants at the proper point to reach all parasites thereon. The apparatus is free of complicated arrangements or construction and will not readily get out of order. It is also very durable for the same reason and will be found very efficient for the purpose for which it is designed.

While I have described the apparatus as intended particularly for spraying plants, it may be used for other purposes such as cleaning chicken coops, dog kennels, etc.

Any chemical which is soluble or may be held in suspension can be used in the apparatus whether that chemical be poisonous or non-poisonous and, by supplying the proper agents, the device may be utilized as a fire extinguisher or to soften hard water.

Having thus described my invention, what I claim is:

An apparatus for the purposes set forth comprising a pipe provided with a discharge nozzle at one end and having its opposite end adapted to be connected to a source of water supply, a chemical containing tank, a branch pipe leading from the water pipe to the tank and provided with a cut-off, a discharge pipe leading eccentrically from the bottom of the tank to the water pipe and provided with a cut-off, a vertical shaft journaled eccentrically in the water pipe and having its upper end extending centrally into the bottom of the tank and rotatably mounted in the bottom thereof, a water wheel on the lower end of said shaft within the water pipe, and an agitator on the upper end of said shaft within the tank.

In testimony whereof I have hereunto set my hand in presence of two subscribing witnesses.

CHARLES F. SITES.

Witnesses:
  CHARLES H. FOLLETT,
  FRANK B. DUDGEON.